United States Patent [19]

Yamada et al.

[11] Patent Number: 5,724,654
[45] Date of Patent: Mar. 3, 1998

[54] HOUSING FOR PAGER RECEIVER HAVING BATTERY COVER LOCKING PIECE WHICH EXPOSES TERMINAL FOR EXTERNAL ACCESS

[75] Inventors: Hiroyasu Yamada, Shizuoka; Toshiyuki Tamaru, Tokyo, both of Japan

[73] Assignee: NEC Corporation, Tokyo, Japan

[21] Appl. No.: 532,051

[22] Filed: Sep. 22, 1995

[30] Foreign Application Priority Data

Sep. 22, 1994 [JP] Japan ............... 6-227626

[51] Int. Cl.⁶ ........................................... H04B 1/08
[52] U.S. Cl. ............... 455/348; 455/351; 455/38.1; 455/90; 455/128; 340/825.44
[58] Field of Search ................................ 455/347, 348, 455/351, 128, 90, 38.1; 340/825.44; 381/69.2; 429/96, 97, 100

[56] References Cited

U.S. PATENT DOCUMENTS

| | | | |
|---|---|---|---|
| 5,202,197 | 4/1993 | Ausell et al. | 429/96 X |
| 5,206,098 | 4/1993 | Cho et al. | 429/96 |
| 5,261,122 | 11/1993 | Otsuki et al. | 455/90 |
| 5,307,511 | 4/1994 | Takahashi | 455/90 |
| 5,372,395 | 12/1994 | Yang | 429/96 X |
| 5,508,124 | 4/1996 | Gordecki et al. | 429/97 |

FOREIGN PATENT DOCUMENTS 64-12474  1/1989  Japan.

Primary Examiner—Reinhard J. Eisenzopf
Assistant Examiner—Philip J. Sobutka
Attorney, Agent, or Firm—Sughrue, Mion, Zinn, Macpeak & Seas, PLLC

[57] ABSTRACT

In a structure of a housing of a pager receiver having a terminal for external connection for external communication of data, a battery cover for removably covering a battery receptacle portion, a locking piece for locking the battery cover at the position covering said battery receptacle portion and an opening portion for permitting external connection of the terminal. The locking piece locks the battery cover, and, in conjunction therewith, closes the opening. The locking piece is movable for exposing the opening as shifted in a condition where the battery cover is released away from the battery receptacle portion.

10 Claims, 5 Drawing Sheets

HOUSING FOR PAGER RECEIVER HAVING BATTERY COVER LOCKING PIECE WHICH EXPOSES TERMINAL FOR EXTERNAL ACCESS

BACKGROUND OF THE INVENTION

1. Field of the Invention

The present invention relates generally to a housing structure for a pager receiver. More specifically, the invention relates to a housing structure of a pager receiver having a structure for closing an information accessing terminal provided on an installed electric circuit board.

2. Description of the Related Art

In general, a pager receiver (hereinafter occasionally referred to simply as "receiver") includes an electronic circuit board having a memory as a storage means for storing call numbers and so forth. In order to externally write information, an information access terminal is provided on the electronic circuit board.

Conventionally, this type of receiver comprises an electronic circuit board 101 having a memory 102 and an information access terminal 103 within an internal space of the housing 100, as shown in FIG. 7. When the information, such as a call number and so forth, is written in, the housing is disassembled to expose the internally incorporated electronic circuit board 101 to connect a writing device to the not shown information accessing terminal 103. Accordingly, in this type of the conventional receiver, for writing information, it is required to once disassemble the housing and makes the operation cumbersome.

On the other hand, as a solution for the problems set forth above, there is a pager receiver, in the prior art, in which an opening window 104 is formed in a part of the housing 100 and the information accessing terminal 103 is placed in the opening window 104 to be externally exposed therethrough. By the construction as set forth above, it becomes possible to permit connection of the writing device to the information accessing terminal without requiring disassembling of the housing. However, when the information accessing terminal 103 is externally exposed through the opening window 104, it is likely that the electronic circuit board 101 may be damaged by users mischief or so forth, or damage is caused on the circuit on the electronic circuit board due to charging of static electricity because of malfunction or failure.

On the other hand, in order to solve the problem associated with exposure of the information accessing terminal, a closure cap for the opening window 104 can be provided. However, such an approach is not preferred due to the increased number of parts required.

Furthermore, in the prior art, in order to make the information accessing terminal 103 not accessible for normal use of the receiver, and for facilitating writing of information in the memory, there is a receiver, in which the opening window 104 is provided in a battery receptacle portion 105 to place the information accessing terminal 103 therein, as shown in FIG. 9. For such a conventional pager receiver, there is a technology disclosed in Japanese Unexamined Patent Publication (Kokai) No. 64-12474 for "Housing Structure for Pager Receiver". In the above-mentioned publication, there is disclosed the pager receiver, in which the battery receptacle portion 105 is provided in the part of the housing 100 and a battery cover 106 is removably provided in the opening of the battery receptacle portion 105, the electric circuit board 101 is internally installed within a chamber defined by the housing 100 and the battery receptacle portion 105, and the opening window 104 communicating with the interior of the chamber of the battery receptacle portion 105 is formed in the battery receptacle portion 105 to enable connection of the writing device to the information accessing terminal 103 through the opening window 104. However, even in the above-mentioned prior art, upon opening the battery cover 106 for the purpose of exchanging the battery, the information accessing terminal 103 is exposed to continue the problems of charging of the static electricity and failure by mischief.

On the other hand, in the above-identified publication, as shown in FIG. 10, there is a structure, in which an insulative seal 107 is stuck on the opening window 104. With the construction as set forth above, the opening window 104 is held closed even when the battery cover 106 is open to improve electrostatic withstanding voltage and to prevent foreign matter, such as dust and so forth from penetrating into the information accessing terminal 103 or the electronic circuit board 101. However, this structure is still less preferred for the seal 107 is required as an extra part.

SUMMARY OF THE INVENTION

Therefore, it is an object of the present invention to solve the problems as set forth above.

Another object of the invention is to provide a structure of a housing of a pager receiver, in which an information accessing terminal is enclosed so that an information writing terminal may not be externally exposed only by removing a battery cover to provide higher reliability and security.

According to the first aspect of the invention, a structure of a housing of a pager receiver having a terminal for external access for communication with an external device, comprises:

a battery receptacle portion;

a battery cover removably covering the battery receptacle portion;

a locking piece for locking the battery cover at the position covering the battery receptacle portion;

an opening portion for external connection of the terminal for external access, the locking piece locking the battery cover in the condition of covering the battery receptacle portion and closing the opening portion; and the locking piece being released from the opening portion at the condition where the battery cover is released from locking.

In such a case, the locking piece may be provided slidably on the housing in the vicinity of the battery receptacle portion of the housing, and movable between a first position locking the battery cover from releasing away from the battery receptacle portion by slidingly shifting toward the battery cover, a second position for permitting releasing of the battery cover away from the battery receptacle portion by slidingly shifting away from the battery cover, and a third position for exposing the opening portion by sliding shifting toward the battery receptacle portion. The battery cover may include an engaging means for preventing the locking piece from shifting to the third position while it is placed for covering the battery receptacle portion.

The battery receptacle portion may have a guide edge for guiding sliding of the battery cover in one direction, and the battery cover may be placed at a position covering the battery receptacle portion by sliding along the guiding edge in one direction and at a position released away from the battery receptacle portion by sliding along the guide edge in the other direction, and the locking piece locks the battery cover from sliding movement in the other direction by sliding it toward the battery cover. In the preferred construction, the battery cover may have an engaging means for blocking shifting of the locking piece to the third position for exposing the opening portion at the position covering the battery receptacle portion.

The battery receptacle portion preferably has a guide edge for guiding sliding of the battery cover in one direction, and the battery cover is placed at a position covering the battery receptacle portion by sliding along the guiding edge in one direction and at a position released away from the battery receptacle portion by sliding along the guide edge in the other direction, the locking piece locks the battery cover from sliding movement in the other direction by sliding it toward the battery cover, and the locking piece is provided slidably on the housing in the vicinity of the battery receptacle portion of the housing, and movable between a first position locking the battery cover from releasing away from the battery receptacle portion by slidingly shifting toward the battery cover, a second position for permitting releasing of the battery cover away from the battery receptacle portion by slidingly shifting away from the battery cover, and a third position for exposing the opening portion by sliding shifting toward the battery receptacle portion.

In such a case, the battery cover has an engaging means for blocking shifting of the locking piece to the third position for exposing the opening portion at the position covering the battery receptacle portion.

According to the second aspect of the invention, a structure of a housing of a pager receiver having a terminal for external access for communication with external device, comprises:

- a battery receptacle portion;
- a battery cover removably covering the battery receptacle portion;
- a locking piece for locking the battery cover at the position covering the battery receptacle portion;
- an opening portion for external connection of the terminal for external access,
- the battery receptacle portion having a guide edge for guiding sliding of the battery cover in one direction, and the battery cover being placed at a position covering the battery receptacle portion by sliding along the guiding edge in one direction and at a position released away from the battery receptacle portion by sliding along the guide edge in the other direction,
- the locking piece locking the battery cover from sliding movement in the other direction by sliding it toward the battery cover, and
- the locking piece being provided slidably on the housing in the vicinity of the battery receptacle portion of the housing, and movable between a first position locking the battery cover from releasing away from the battery receptacle portion by slidingly shifting toward the battery cover, a second position for permitting releasing of the battery cover away from the battery receptacle portion by slidingly shifting away from the battery cover, and a third position for exposing the opening portion by sliding shifting toward the battery receptacle portion.

Other objects, features and advantages of the present invention will becomes apparent from the detailed description given hereinafter.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiments of pager receivers according to the present invention will be discussed hereinafter in detail with reference to the accompanying drawings, particularly to FIGS. 1 to 6. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

Figure 1:
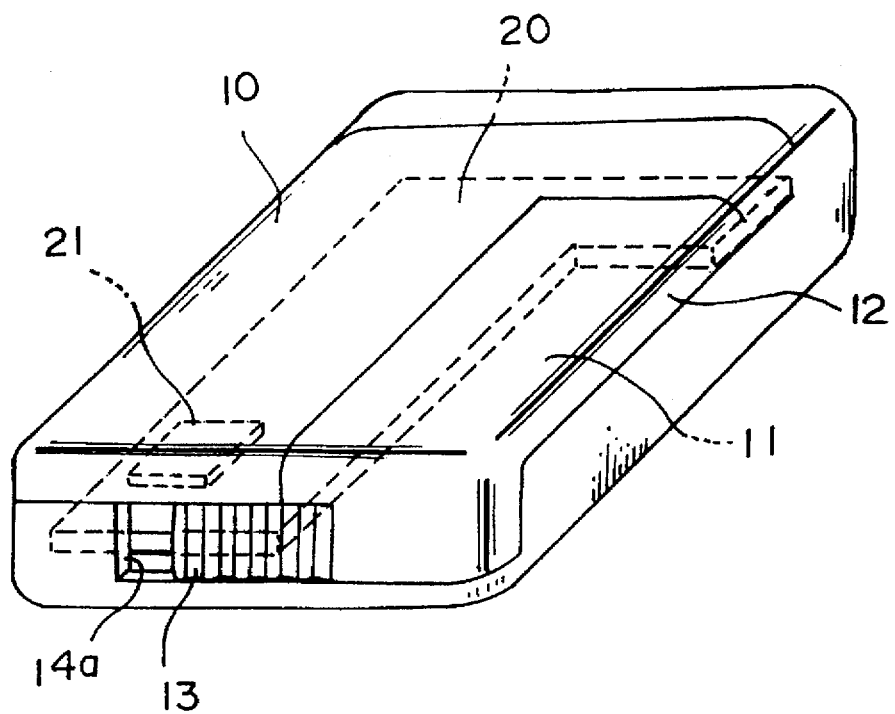
FIG. 1 is a perspective view showing a construction of the first embodiment of a pager receiver according to the present invention.
Figure 2:
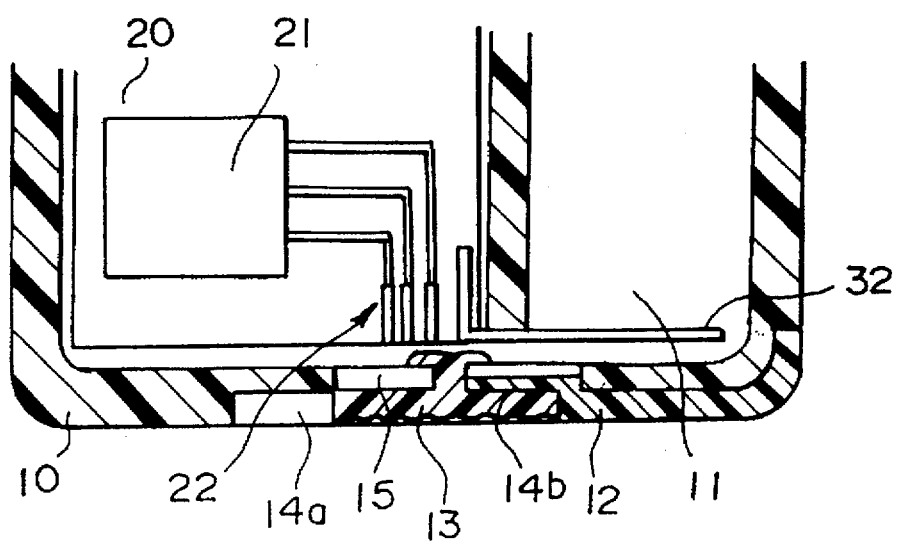
FIG. 2 is an enlarged perspective view showing the major part of the paper receiver of FIG. 1.
Figure 3:
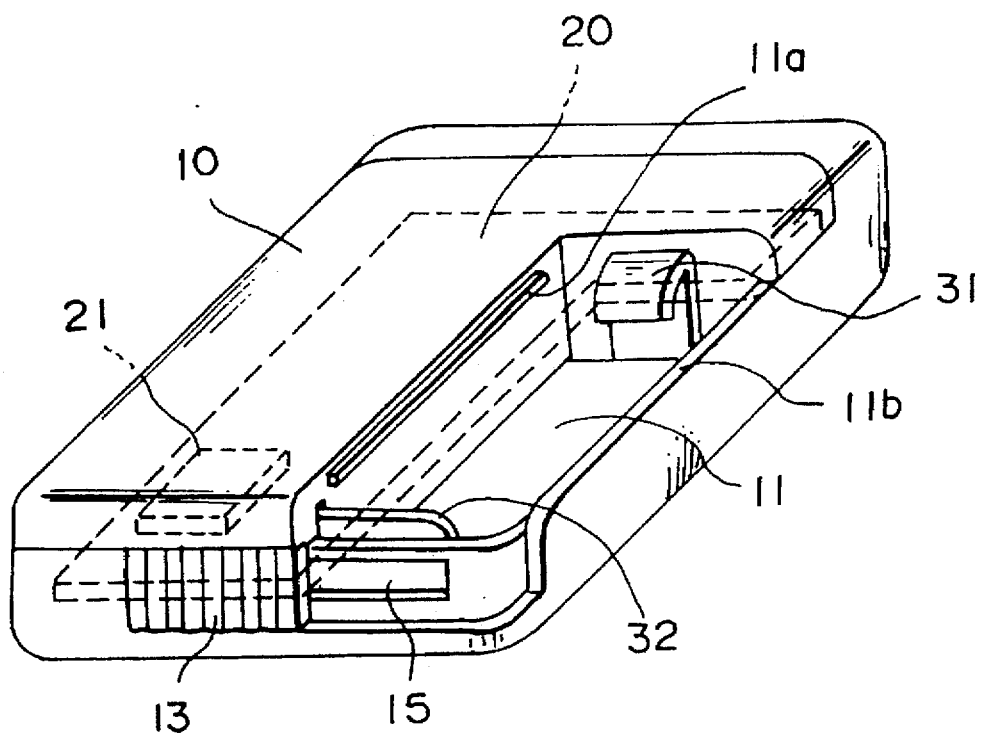
FIG. 3 is a perspective view in a condition where a battery cover is removed in the pager receiver of FIG. 1.
Figure 4:
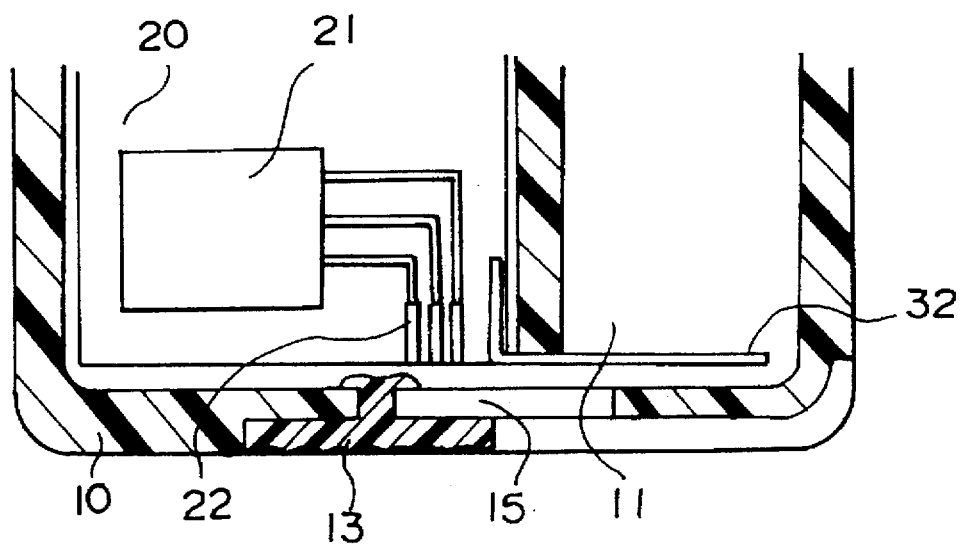
FIG. 4 is an enlarged perspective view showing the major part of the pager receiver of FIG. 3.
Figure 5:
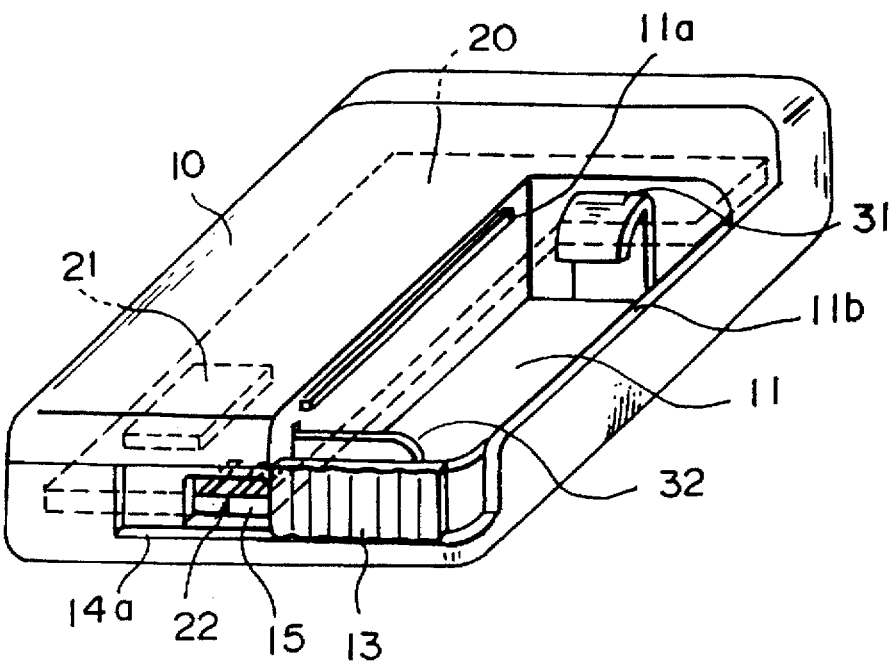
FIG. 5 is a perspective view showing the condition, in which an information accessing terminal is installed in an opening window, in the pager receiver of FIG. 1.
Figure 6:
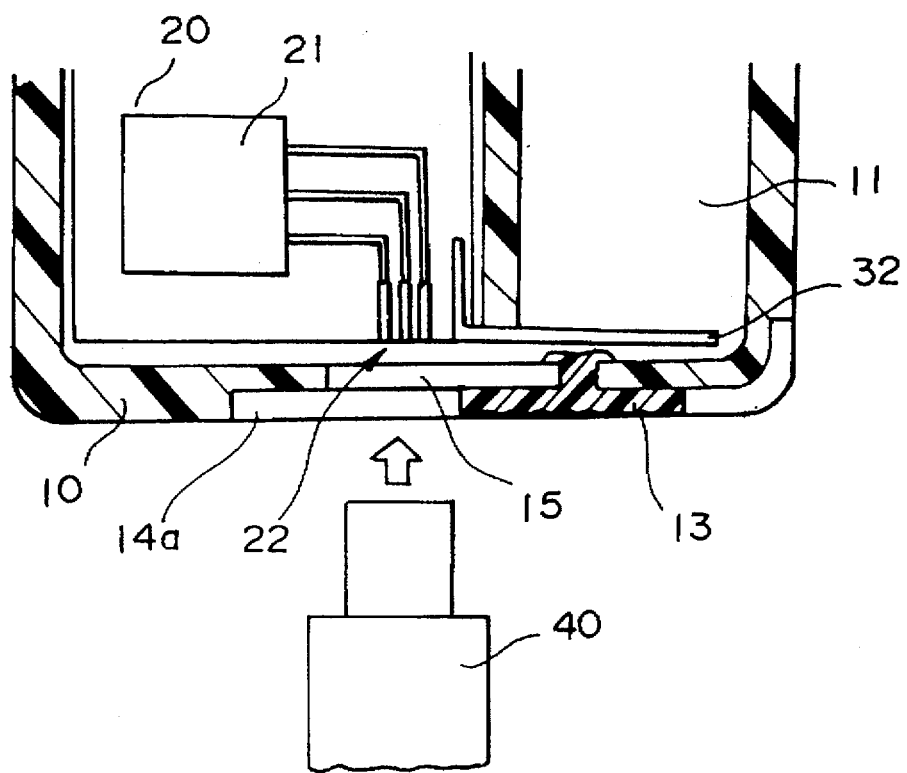
FIG. 6 is an enlarged perspective view showing the major part of the pager receiver of FIG. 5.
Figure 7:
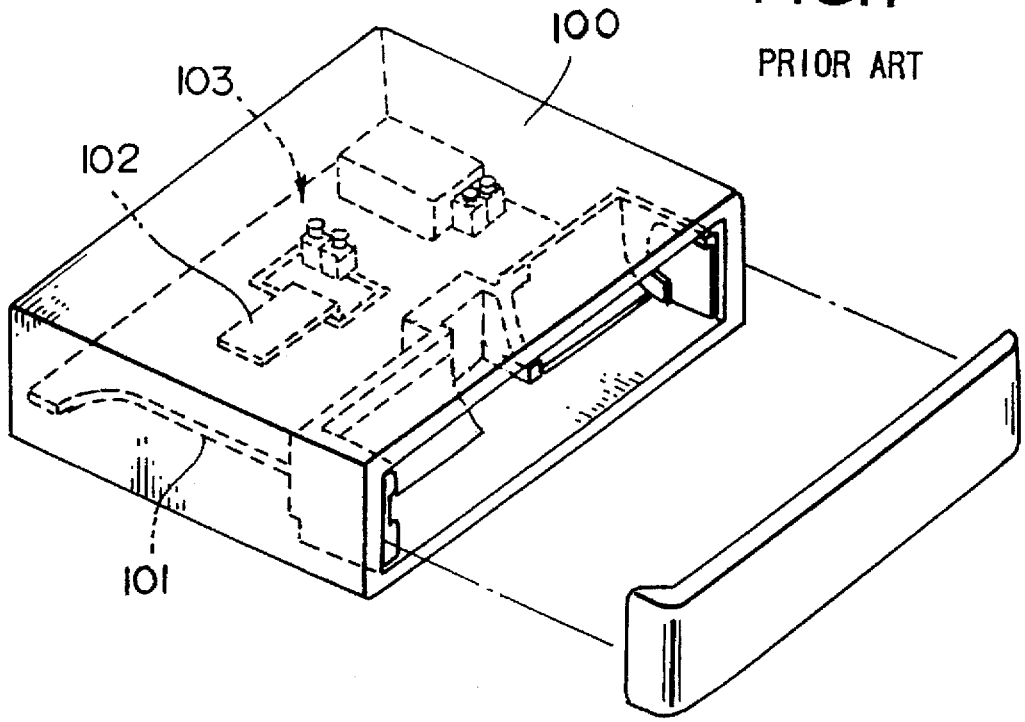
FIG. 7 is a perspective view showing a construction of the conventional pager receiver.
Figure 8:
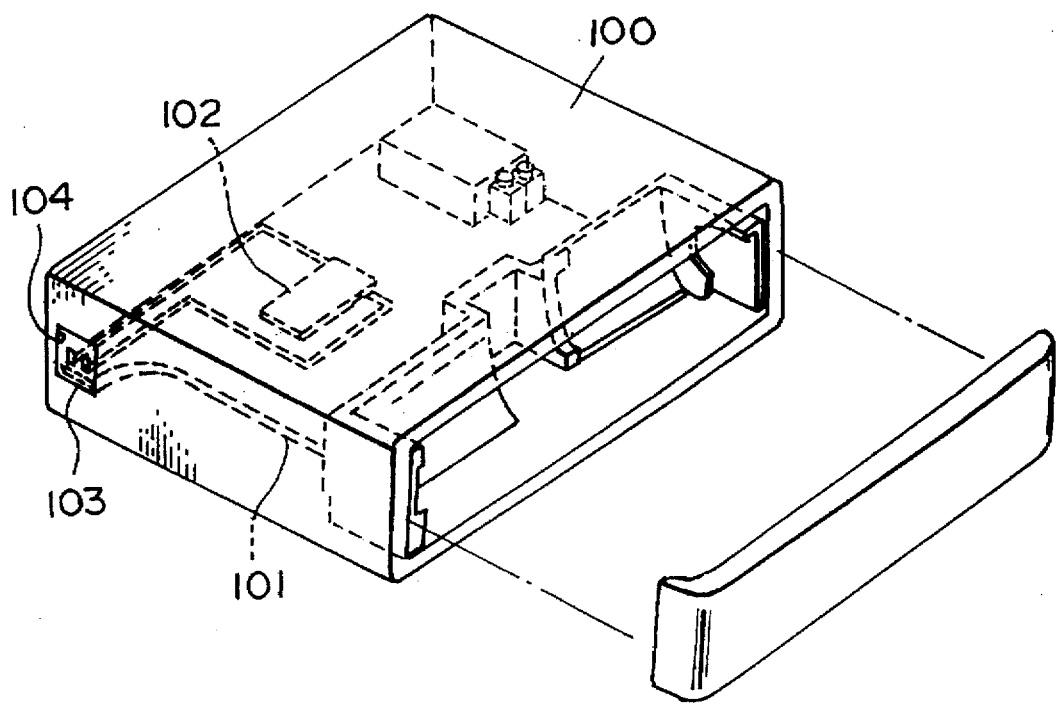
FIG. 8 is a perspective view showing a construction of another conventional pager receiver.

FIGS. 1 to 6 show the first embodiment of a pager receiver according to the present invention, in which FIG. 1 is a perspective view showing a construction of the first embodiment of a pager receiver according to the present invention, FIG. 2 is an enlarged perspective view showing the major part of the paper receiver of FIG. 1, FIG. 3 is a perspective view in a condition where a battery cover is removed in the pager receiver of FIG. 1, FIG. 4 is an enlarged perspective view showing the major part of the pager receiver of FIG. 3, FIG. 5 is a perspective view showing the condition, in which an information accessing terminal installed in an opening window, in the pager receiver of FIG. 1, and FIG. 6 is an enlarged perspective view showing the major part of the pager receiver of FIG. 5.

As shown in the respective figures, the shown embodiment of a pager receiver according to the present invention, has a substantially rectangular parallel piped housing 10 and an electronic circuit board 20 installed in the housing 10 and, on which various electronic parts are arranged.

The housing 10 is formed with a battery receptacle portion 11 for storing a battery and is defined by cutting out at least adjacent two surfaces. The opening surface of the battery receptacle portion 11 is covered by a battery cover 12. As shown in FIG. 3, in the battery receptacle portion 11, guiding edges 11a and 11b are formed in mutually parallel relationship to each other. By engaging the battery cover 12 to the guiding edges 11a and 11b, the battery receptacle portion 11 can be opened and closed. In the shown example, from the condition of FIG. 1, the battery cover 12 can be removed by pulling the battery cover 12 frontwardly in FIG. 3. On the other hand, within the battery receptacle portion 11, contacts 31 and 32, upon setting of the battery, are provided.

On the other hand, on the surface oriented in the direction for sliding the battery cover 12 of the housing 10 in the direction of removal (hereinafter, this surface is referred to as "front surface"), a locking piece 13 preventing the battery cover 12 from sliding is provided. The locking piece 13 is disposed within a recessed portion 14a provided in the vicinity of the portion where the opening surface of the battery receptacle portion 11 at the front surface of the housing 10 is provided for sliding and moving in the direction of the opening surface of the battery receptacle portion 11. On the other hand, a locking projection is formed on the locking piece 13 so that it may cooperate with some means, such as an engaging groove formed in the recessed portion 14a to prevent the locking piece 13 from coming off even at the end of a sliding stroke. On the other hand, at the position of the front surface side of the battery cover 12 mating with the locking piece 13, a recessed portion 14b continuous to the recessed portion 14a at the front surface of the housing 10 is formed. Then, at the condition where the battery cover 12 is set in the battery receptacle portion 11, by sliding the locking piece 13, the locking piece 13 is contacted to the front surface side recessed portion 14b of the battery cover 12 to lock the battery cover 12. The recessed portion 14b formed at the front surface side of the battery cover 12 is formed in such a manner that the locking piece 13 may not slide over an entire stroke of the battery cover 12, for instance, and may stop sliding at the mid way.

It should be noted that, at the front surface side of the battery cover 12, it is not always required to provide the recessed portion 14b for sliding the locking piece 13 and it is possible to establish locking by contacting the front surface side of the battery cover 12 at the condition where the locking piece 13 is slid. In this case, at the front surface side of the battery cover 12, a contact piece for preventing the locking piece 13 from sliding over an entire stroke toward the battery cover 12, has to be provided.

In the recessed portion 14a for slidingly setting the locking piece 13 provided at the front surface of the housing 10, at the position close to the battery cover 12, an opening window 15 directed to inside of the housing 10 is provided. As shown in FIG. 1, the opening window 15 is designed so as not to be exposed in the condition where the locking piece 13 is slid for locking the battery cover 12. By this, as shown in FIG. 5, the opening window 15 is exposed only when the battery cover 12 is released and fully slid toward the battery receptacle portion as shown in FIG. 5. On the other hand, at the condition where the locking piece 13 is released from the locking position for removing the battery cover, the opening window 15 is held closed and not exposed.

As shown in FIGS. 1 to 6, the electronic circuit board 20 mounts a memory 21 for storing information, such as call numbers and so forth, and an information accessing terminal 22 for writing and reading various information in and from the memory 21. In the drawings, other electronic parts to be mounted on the electronic circuit board 20 are neglected for simplification of disclosure. The memory 21 and the information accessing terminal 22 are electronically connected by conductors printed on the electronic circuit board 20. As shown, the information accessing terminal 22 is installed so as to be externally exposed through the opening window 15 of the housing. By connecting a cable for external connection to the information accessing terminal 22 exposed through the opening window 15, writing and reading of information can be performed.

It should be noted that FIGS. 1 to 6 show only major components of the shown embodiment and other components which are not essential to the subject matter of the present invention have been neglected from illustration. As known in the art, in the practical construction, a CPU for performing various data processing and other components is mounted on the electronic circuit board 20, and the speaker and/or liquid crystal display and so forth, for performing calling operation and so forth are mounted in the housing 10.

Next, the operation of the shown embodiment will be discussed with reference to the sections in FIGS. 2, 4 and 6.

Upon use of the shown embodiment of the pager receiver, the battery cover 12 is held locked by the locking piece 13. As shown in FIG. 2, the opening window 15 is held closed by the locking piece 13 at this condition. Accordingly, the information accessing terminal 22 is isolated from the outside.

Next, when the battery cover 12 is removed from the housing 10 for the purpose of exchanging of the battery or so forth, as shown in FIG. 4, since locking by the locking piece 13 has to be released, the locking piece 13 is slid in the direction away from the battery cover 12. Even at this condition, as shown in FIG. 4, the opening window 15 is held closed by the locking piece 13. Therefore, the external accessing terminal 22 is maintained in the position isolated from the outside.

Next, when the information accessing terminal 22 is to be exposed for writing information in the memory 21 or for updating the content in the memory 21, as shown in FIG. 6, at the condition where the battery cover 12 is removed, the locking piece 12 is slid at full stroke toward the battery receptacle portion 11. In this case, as shown, since motion of the locking piece 13 is not blocked by the battery cover 12, the locking piece 13 can be shifted at the position where the opening window 15 can be exposed. By this, the information accessing terminal 22 is exposed. Then, a connector 40 of a writing device can be connected to the information accessing terminal 22.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope encompassed and equivalents thereof with respect to the feature set out in the appended claims.

Figure 9:
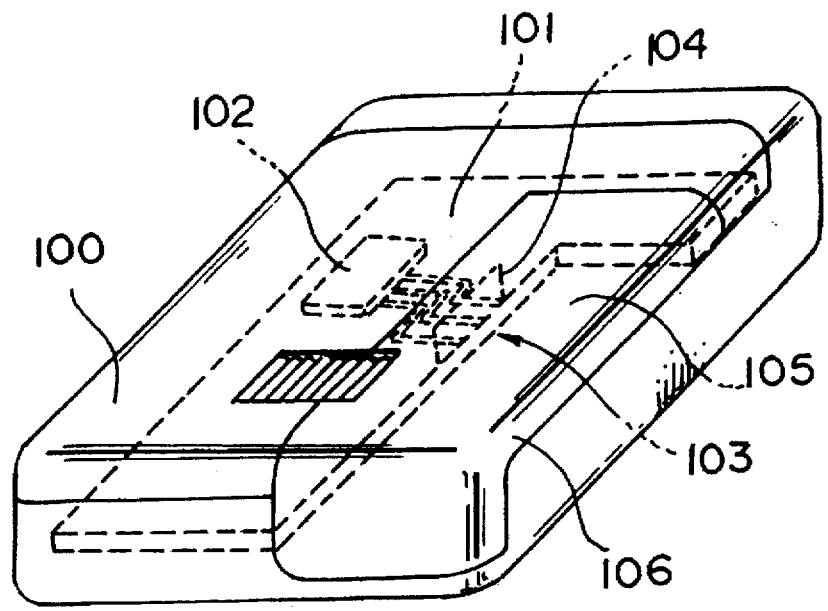
FIG. 9 is a perspective view showing a construction of a further conventional pager receiver.
Figure 10:
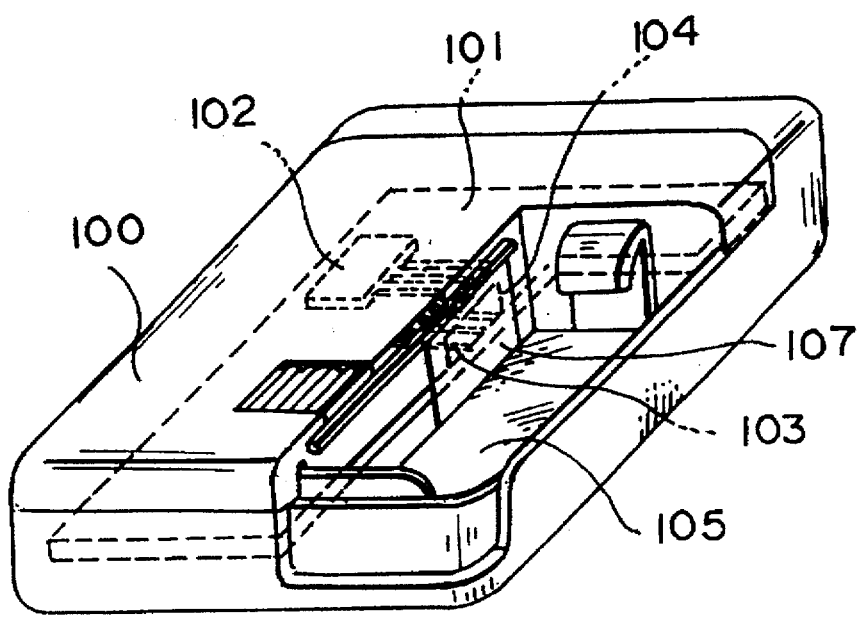
FIG. 10 is a perspective view showing a condition where a battery cover of the pager receiver of FIG. 9 is removed.

For instance, while the shown embodiment is designed to arrange the opening window to be installed the information accessing terminal and the locking piece on the surface positioned in the sliding direction of the battery cover so that the locking piece may serve both for locking the battery cover and for covering the information accessing terminal, it is also possible to provide the opening window and the locking piece on the surface perpendicular (upper surface in the shown case) to the sliding direction of the battery cover as in the housing of FIGS. 9 and 10 illustrating the prior art.

In this case, a part of the electronic circuit board is positioned below the opening window perpendicularly to mount the information accessing terminal thereon.

Also, while the shown embodiment opens and closes the battery receptacle portion by sliding the battery cover in parallel to one edge of the housing, it is possible to secure the battery cover to the housing via a pivot pin or so forth for pivotally opening and closing the battery receptacle portion by pivotal movement of the battery cover on the mating plane. In such a case, the locking piece has to be provided at the position, at which pivotal movement of the battery cover can be blocked. Then, the opening window may be formed at the position to be covered by the locking piece unless the battery cover is shifted to the open position and the locking piece is slidingly shifted to a terminal exposing position.

As set forth, according to the present invention, since the information accessing terminal is exposed for writing information in the memory only when the battery cover is removed or pivoted away from the housing and the locking piece is shifted to the predetermined terminal exposing position, the information accessing terminal as well as the electronic circuit board will never be exposed unintentionally. Therefore, damaging of the electronic circuit board or breakage of the circuit due to charging of electrostatic power can be successfully prevented to avoid possibility of causing malfunction or failure of the pager receiver.

On the other hand, since the locking piece can maintain closure of the opening window unless the locking piece is shifted to the predetermined position and thus normally enclose the information accessing terminal, it becomes unnecessary to provide a cap or seal for closure of the information accessing terminal. Therefore, the present invention is successful in avoiding an increasing of number of parts while isolation of the information accessing terminal and/or the electronic circuit board from the external atmosphere is successfully achieved.

Furthermore, even when locking of the locking piece is released during normal use or when the battery cover is removed, the information accessing terminal can be held enclosed by the locking piece, and the user who is not knowledgeable about the capability of exposing the information accessing terminal by shifting of the locking piece toward the terminal exposing position, may not access the information accessing terminal. Accordingly, the shown invention achieved quite high security.

What is claimed is:

1. A housing for a pager receiver having a terminal for external access for communication with an external device, comprising:

a battery receptacle portion;

a battery cover removably covering said battery receptacle portion;

a locking piece for locking said battery cover at a position covering said battery receptacle portion; and an opening portion for external connection of said terminal for providing external access, wherein said locking piece in a first position locks said battery cover in said position of covering said battery receptacle portion and closing said opening portion; and wherein said locking piece in a second position is released and exposes said opening portion at another position wherein said battery cover is released from locking; and wherein said locking piece in a third position exposes said opening portion by sliding toward said battery receptacle portion.

2. A pager receiver as set forth in claim 1, wherein said battery receptacle portion has a guide edge for guiding sliding of said battery cover in one direction, and said battery cover is placed at a position covering said battery receptacle portion by sliding along said guiding edge in one direction and at a position released away from said battery receptacle portion by sliding along said guide edge in the other direction, and said locking piece locks said battery cover from sliding movement in said the other direction by sliding it toward said battery cover.

3. A pager receiver as set forth in claim 2, wherein said battery cover has an engaging means for blocking shifting of said locking piece to said third position for exposing said opening portion at the position covering said battery receptacle portion.

4. A housing for a pager receiver having a terminal for external access for communication with an external device, comprising:

a battery receptacle portion;

a battery cover removably covering said battery receptacle portion;

a locking piece for locking said battery cover at a position covering said battery receptacle portion; and an opening portion for external connection of said terminal for providing external access, wherein said locking piece locks said battery cover in said position of covering said battery receptacle portion and closing said opening portion; and wherein said locking piece is released and exposes said opening portion at another position wherein said battery cover is released from locking; and wherein said locking piece is provided slidably on said housing in the vicinity of said battery receptacle portion of said housing, and movable between a first position locking said battery cover from releasing away from said battery receptacle portion by slidingly shifting toward said battery cover, a second position for permitting releasing of said battery cover away from said battery receptacle portion by slidingly shifting away from said battery cover, and a third position for exposing said opening portion by sliding shifting toward said battery receptacle portion.

5. A pager receiver as set forth in claim 4, wherein said battery cover includes an engaging means for preventing said locking piece from shifting to said third position while it is placed for covering said battery receptacle portion.

6. A housing for a pager receiver having a terminal for external access for communication with an external device, comprising:

a battery receptacle portion;

a battery cover removably covering said battery receptacle portion;

a locking piece for locking said battery cover at a position covering said battery receptacle portion; and an opening portion for external connection of said terminal for providing external access, wherein said locking piece locks said battery cover in said position of covering said battery receptacle portion and closing said opening portion; and wherein said locking piece is released and exposes said opening portion at another position wherein said battery cover is released from locking; and wherein said battery receptacle portion has a guide edge for sliding sliding of said battery cover in one direction, and said battery cover is placed at a position covering said battery receptacle portion by sliding along said guiding edge in one direction and at a position released away from said battery receptacle portion by sliding along said guide edge in the other direction; and wherein said locking piece locks said battery cover from sliding movement in said the other direction by sliding it toward said battery cover; and said locking piece is provided slidably on said housing in the vicinity of said battery receptacle portion of said housing, and movable between a first position locking said battery cover from releasing away from said battery receptacle portion by slidingly shifting toward said battery cover, a second position for permitting releasing of said battery cover away from said battery receptacle portion by slidingly shifting away from said battery cover, and a third position for exposing said opening portion by sliding shifting toward said battery receptacle portion.

7. A pager receiver as set forth in claim 6, wherein said battery cover has an engaging means for blocking shifting of said locking piece to said third position for exposing said opening portion at the position covering said battery receptacle portion.

8. A housing for a pager receiver having a terminal for external access for communication with an external device, comprising:

a battery receptacle portion;

a battery cover removably covering said battery receptacle portion;

a locking piece for locking said battery cover at a position covering said battery receptacle portion;

an opening portion for external connection of said terminal for providing external access, wherein said battery receptacle portion has a guide edge for guiding sliding of said battery cover in one direction, and said battery cover being placed at a position covering said battery receptacle portion by sliding along said guiding edge in one direction and at a position released away from said battery receptacle portion by sliding along said guide edge in the other direction, said locking piece locking said battery cover from sliding movement in said the other direction by sliding it toward said battery cover, and said locking piece being provided slidably on said housing in the vicinity of said battery receptacle portion of said housing, and movable between a first position locking said battery cover from releasing away from said battery receptacle portion by slidingly shifting toward said battery cover, a second position for permitting releasing of said battery cover away from said battery receptacle portion by slidingly shifting away from said battery cover, and a third position for exposing said opening portion by sliding shifting toward said battery receptacle portion.

9. A pager receiver as set forth in claim 8, wherein said battery cover has an engaging means for blocking shifting of said locking piece to said third position for exposing said opening portion at the position covering said battery receptacle portion.

10. A pager receiver as set forth in claim 8, wherein said locking piece and said opening portion are provided at positions in the vicinity of said battery receptacle portion at the side surface of said housing located in a sliding direction of said battery cover.

* * * * *